Nov. 13, 1951     G. C. LAWRENCE     2,574,490
MAGNETIC BLIND-LANDING SYSTEM

Filed March 4, 1947     2 SHEETS—SHEET 1

*INVENTOR.*
GEORGE C. LAWRENCE
BY

ATTORNEY

Patented Nov. 13, 1951

2,574,490

UNITED STATES PATENT OFFICE 2,574,490

MAGNETIC BLIND-LANDING SYSTEM

George C. Lawrence, Pine Beach, N. J.

Application March 4, 1947, Serial No. 732,361

5 Claims. (Cl. 177—352)

(Granted under the act of March 3, 1883, as amended April 30, 1928; 370 O. G. 757)

This invention relates in general to an electrical system and more specifically to an electromagnetic system to assist vehicles, e. g. aircraft, in making blind landings.

At present there are known several types of blind-landing systems, but almost all of these have inherent disadvantages such as complexity of equipment, difficulty of maintenance, and excessive number of operating personnel or detailed pilot training required. The system herein disclosed overcomes all of these deficiencies and includes other advantages over those now in operation.

One object of this invention is to provide a simple, yet reliable and accurate blind-landing system which may be operated by station personnel and pilot with a minimum of instruction.

Further objects and advantages of this invention, as well as its construction, arrangement and operation, will be apparent from the following description and claims in connection with the accompanying drawing, in which:

Figure 2:
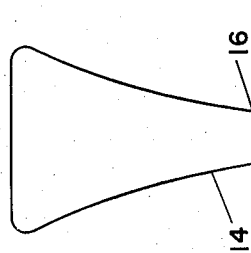
Fig. 2 illustrates a characteristic layout of such a system on one runway of an airfield.
Figure 2:
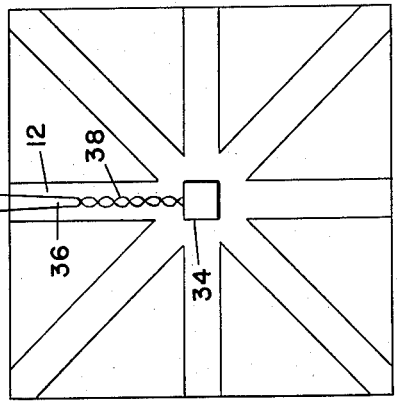

The essential requirements of any blind-landing system are accuracy and reliability. Additional requirements of secondary importance are simplicity, flexibility, lightweight airborne equipment, a minimum of operating personnel, small power supply and simplicity of training personnel.

A magnetic system for blind landings as described herein excels currently used radiation methods in all of the above requirements. It can generate a glide path accurate to within a few feet of the ground. It is reliable in all types of weather, not being affected by any type of precipitation, and it can be installed without regard to reflections from the surrounding terrain.

The fact that a magnetic system meets the secondary requirements listed above will become apparent from the following description. This system is particularly adapted to low-speed aircraft, such as airships, or for the final stages of a landing operation where precision rather than a long-distance indication is required.

Another factor worthy of consideration is the use of this system in conjunction with the standard radio-beam setup employed throughout the world. It is a well known fact that an aural null exists when the receiver is above the transmitting point, and when a pilot enters the null, if the station is located at the edge of an airport, he can immediately switch to the landing system and be brought in safely in the most obscure weather.

The equipment required for the present system comprises a means for establishing a controllable magnetic field in the landing approach area of an airfield and suitable detection and indicating equipment in the aircraft.

The ground installation is composed of the power supply and loop assembly. The power supply may be alternating current of any practical voltage and frequency or may be an audio-frequency oscillator. The power requirement is small in view of the fact that the total power contributes to the useful field. The loop is a single-conductor laid out in a pattern similar to that shown in Fig. 2. Herein, single conductor is to be construed to mean not only a single strand of conducting material, but a plurality of conductors connected in parallel or a plurality of loops connected in series, as may be desirable to utilize the characteristics of the power supply to the best advantage. However, power requirements of the system are so modest that a single loop of No. 14 wire has been found to be adequate when energized from a 1000 cycle source. The layout and spacing of the loop is adjusted as required in order to set up a magnetic field such that the predetermined glide path coincides with points having a constant vertical component of flux density, the intensity of which is governed by the current in the loop, and zero horizontal component of flux density (in the direction perpendicular to the glide path). The latter condition follows automatically if the desired glide path lies entirely in a vertical plane and if the conductor is arranged symmetrically with respect to such plane. The simplest glide path (one of constant slope from the point where the aircraft enters the influence of the magnetic field to the point where the wheels touch the ground) requires an arrangement of conductors that is similar to a cross-section of a funnel, with the narrow end at the landing point, and with the sides concave as viewed from outside of the array; that is to say, the conductors are nearly parallel and close together at the landing point, and they diverge with ever-increasing spacing and included angle as the array extends toward the area where the plane enters its influence. Variations are possible to cope with special conditions. For example, if it is desirable for the plane to approach the field at a low altitude, then at one point to rise in order to avoid an obstacle, and then to come in for a landing on a uniform downward slope, the array will comprise a first part where the conductors are substantially parallel and spaced according to the altitude desired for the initial approach, a second part resembling an outward bulge that causes the locus of constant vertical component of flux density to recede from the ground to a height sufficient to clear the obstacle, and a third part similar to the aforementioned funnel-shaped figure with the narrow end at the landing point. The same principle may be extended, for example, to signal to the pilot the last point on the runway at which it is permissible to attempt a landing and beyond which he must gain altitude and come in for another attempt. The array for this purpose would comprise another funnel-shaped area extending outward in the direction opposite to that of the landing array, and the purpose of having such an arrangement would be to prevent the pilot from overshooting the permissible landing area because he was unable, for some reason, to comply with the first-designated glide path. It is also possible to establish a glide path that follows a curved approach, but in this case symmetry is lacking and special considerations enter into the determination of the required arrangement.

The airborne equipment is comprised of the pickup coils, an amplifier and indicators. The output of the pickup coils is applied to an amplifier which in turn actuates the indicators. Local magnetic disturbances are overcome by incorporating a filter circuit within the amplifier and by employing a frequency-discriminating amplifier if deemed advisable.

The pickup coils are preferably arranged so as to be sensitive respectively to the vertical and transverse horizontal components of the magnetic field that exists in the space lying above the area enclosed by the conductor arrangement, and to indicate at every instant whether the field at the coils is greater or less than the field strength being used as reference. Within that space, the vertical components of flux density attributable to current in all the elements of length of the conductor are additive, and the horizontal components are additive as to elements of the conductor lying on the same side of the axis of the conductor arrangement, but are opposing as to elements lying on opposite sides of said axis. Therefore, at the axis of symmetry and in the vertical plane including that axis (assuming the arrangement to be a symmetrical one) the horizontal components cancel each other and the vertical components reinforce each other. The intensity of the vertical components in any given plane transverse to the axis of symmetry is a maximum at the level of the conductors (substantially ground level) and diminishes progressively as the measurement is taken at greater elevations. A point on the correct glide path is one at which the vertical component of flux density is a predetermined amount (the "datum" intensity) and the horizontal component is zero. A pickup coil disposed vertically in the aircraft is excited in proportion to the vertical component of flux density, and by amplifying the voltage so induced it may be determined if the field intercepted by the coil is of the correct intensity, i. e., if the elevation of the aircraft is correct. The correct horizontal position requires simply zero induced voltage in the corresponding coil, but in order to provide indication of position to the left or to the right of the correct course it is advantageous to design the horizontal-signal amplifier to discriminate between two possible phase relationships of the horizontal component of flux with respect to the vertical component, i. e., depending on the connections to the coils, a horizontal-coil induced voltage in phase with the vertical may be made to indicate that the aircraft is to the left of correct course, and a horizontal-coil induced voltage opposite in phase to the vertical then indicates that the aircraft is to the right of the correct course, or vice versa. When the coils and the amplifier have been connected for proper phase discrimination they will function with any other installation of the type of blind landing system described herein, since the phase relationship of the actual flux components in the space above the conductor arrangement is inherent and unvarying.

Figure 1:
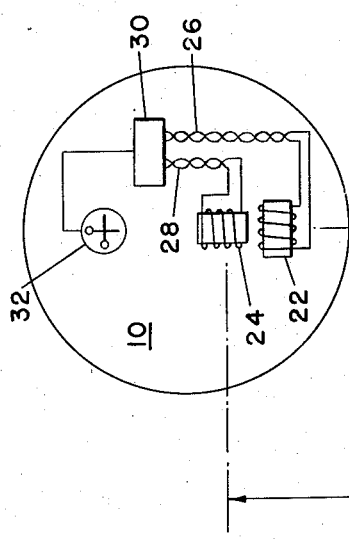
Fig. 1 is a diagrammatic representation of the principle involved.
Figure 1:
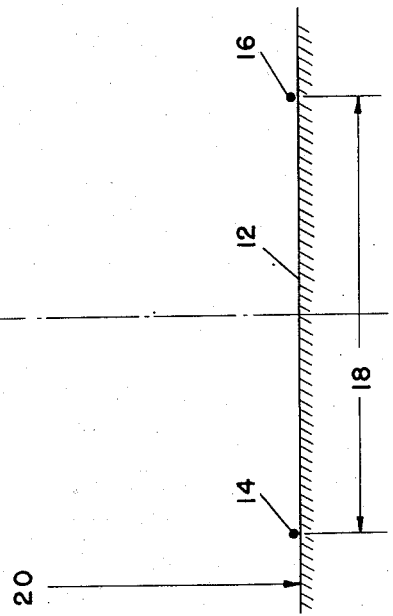

The operation of this system may be readily understood by reference to Fig. 1. Fig. 1 shows the principle involved in a general manner and a special case involving horizontally and vertically disposed coils in the aircraft for determining the lateral position and altitude. This situation is by no means limiting.

It is assumed that the observer is facing the aircraft 10 coming in for a landing on runway 12. 14 and 16 are the two long sides of the triangular loop laid out along the runway separated by a distance 18 at the point at which this cross-section is taken. The conductors are divergent from the point of application of power to the extremity of the loop, as may be seen from Fig. 2. The aircraft 10 is flying at an altitude 20 above the field and the pickup coils 22 and 24 intercept the magnetic lines of force at that point. The coils are connected via coaxial or twisted-pair leads 26 and 28 to amplifier 30, the output of which is applied to indicator 32. Indicator 32 is preferably of a type which indicates simultaneously left-or-right and above-or-below deviations from the designated guide path, for example by the movement of two pointers with respect to vertical and horizontal datum lines; but other types of indicators may be used if desired.

Fig. 2 illustrates a layout appropriate for one runway of an airfield. Conductor loop comprising segments 14 and 16 is excited by power supply 34, which may be located, as shown, in a compartment set into the runway 12, or at any section of the field desired. The spacing of the conductors is seen to be divergent, and they are terminated by closing the end across the third side of the triangle, thereby making one continuous conductor. It should be noted that unless power supply 34 is located at some point on the periphery of the conductor loop, connection thereto should preferably be effected with coaxial or twisted-pair lead 38 in order to avoid setting up extraneous magnetic field components attributable to the current in the lead.

Figure 3:
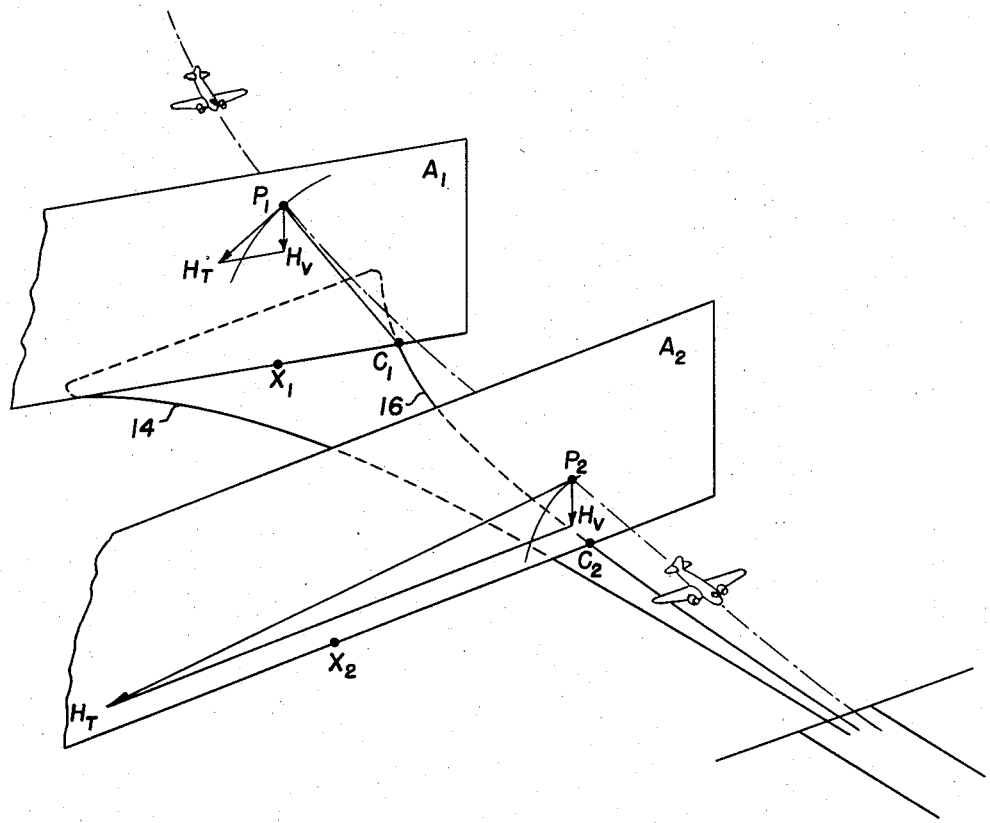
Fig. 3 is a diagrammatic view of a layout showing some geometric relationships.

In Fig. 3 the vertical plane $A_1$ is perpendicular to the cable at the point $C_1$ and cuts the straight-line path at the point $P_1$. Vertical plane $A_2$ is perpendicular to the cable at the point $C_2$ and cuts the straight-line path at the point $P_2$. Points $X_1$ and $X_2$ are in the respective planes and are in the line of intersection between the respective planes and the plane of the cable. Let $H_T$ stand for total magnetic intensity at the point $P_1$ and $H_v$ the vertical component thereof. Obviously $H_v = H_T \cos XC_1P = H_T \cos \phi$. If $H$ is the total magnetic intensity one unit distance from the cable, $$H_v = \frac{H}{C_1P_1} \cos \phi$$

In successive planes taken toward the landing point, $\overline{CP}$ is smaller and smaller, tending to make $H_v$ larger and larger. But $\cos \phi$ in such planes is smaller and smaller. In other words the path is getting "over" the cable; hence the total magnetic force at the path is becoming mostly horizontal; hence the percentage available for vertical component is decreasing; hence it is possible for the net result to be a constant vertical component. By originally positioning the cable so that $\overline{CP}$ gets smaller at the same rate as does $\cos \phi$, the result is that all points P on the path have the same $H_v$.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties hereon or therefor.

What is claimed is:

1. An electromagnetic system to assist a pilot of a vehicle to bring the vehicle along a predetermined path to its destination, said system comprising a loop conductor positioned near the surface of the earth and having a magnetic field of force, arising from current therein, that has only vertical and mutually equal components in any respective plane taken perpendicular to the horizontal component of said path at any respective point thereof, said path having points of inflection only at its ends and at selected other locations.

2. An electromagnetic system to assist a pilot of a vehicle to bring the vehicle along a predetermined path to its destination, said system comprising a single conductor positioned near the surface of the earth and describing an elongated generally triangular outline, the apex of which is in the vicinity of said destination, and means for energizing said conductor with alternating current of predetermined frequency, whereby a uniform field intensity is established at successive points of said path.

3. An electromagnetic system to assist a pilot of a vehicle to bring the vehicle along a predetermined path to its destination, said system comprising a conductor positioned near the surface of the earth and describing an elongated generally triangular outline, the apex of which is in the vicinity of said destination, and two sides of which diverge from said apex and present generally convex faces to each other, and means for energizing said conductor with alternating current of predetermined frequency, whereby a uniform field intensity is established at successive points of said path.

4. An electromagnetic system to assist a pilot of a vehicle to bring the vehicle along a predetermined path to its destination, said system comprising a single conductor positioned near the surface of the earth and describing an elongated generally triangular outline, the apex of which is in the vicinity of said destination, and means for energizing said conductor with alternating current of predetermined frequency and intensity, whereby a datum field intensity is established at successive points of said path.

5. An electromagnetic system to assist a pilot of a vehicle to bring the vehicle along a predetermined path to its destination, said system comprising a conductor positioned near the surface of the earth and describing an elongated generally triangular outline, the apex of which is in the vicinity of said destination, and two sides of which diverge from said apex and present generally convex faces to each other, and means for energizing said conductor with alternating current of predetermined frequency and intensity, whereby a datum field intensity is established at successive points of said path.

GEORGE C. LAWRENCE.

REFERENCES CITED

The following references are of record in the file of this patent:

UNITED STATES PATENTS

| Number | Name | Date |
|---|---|---|
| 2,224,863 | Dingley | Dec. 17, 1940 |
| 2,340,282 | Dingley | Jan. 25, 1944 |

FOREIGN PATENTS

| Number | Country | Date |
|---|---|---|
| 196,633 | Great Britain | Apr. 25, 1923 |

OTHER REFERENCES

Publication, Blind Landing System, by E. N. Dingley, Jr., Aviation, July 1939.